(12) United States Patent
Kosbab et al.

(10) Patent No.: US 8,248,934 B2
(45) Date of Patent: *Aug. 21, 2012

(54) METHODS AND APPARATUS FOR DETERMINING AND DISPLAYING A TRANSACTION RESET METRIC

(75) Inventors: Bruce Kosbab, Colorado Springs, CO (US); Daniel Prescott, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/389,483

(22) Filed: Feb. 20, 2009

(65) Prior Publication Data

US 2010/0214919 A1    Aug. 26, 2010

(51) Int. Cl.
  *H04L 12/26*    (2006.01)
(52) U.S. Cl. .................... 370/231; 370/252; 709/224
(58) Field of Classification Search ............ 370/231, 370/252, 351, 389; 709/224; 710/302
  See application file for complete search history.

(56) References Cited

U.S. PATENT DOCUMENTS

| 6,389,500 | B1 * | 5/2002 | Lin ............................. 710/302 |
| 2005/0027854 | A1 | 2/2005 | Boulanger et al. |
| 2006/0028999 | A1 * | 2/2006 | Iakobashvili et al. ...... 370/252 |
| 2007/0070916 | A1 * | 3/2007 | Lehane et al. ............. 370/252 |
| 2008/0181213 | A1 * | 7/2008 | Ovsiannikov et al. ...... 370/389 |
| 2009/0228585 | A1 | 9/2009 | Kosbab et al. |
| 2009/0296589 | A1 | 12/2009 | Prescott et al. |
| 2010/0128623 | A1 * | 5/2010 | Dunn et al. ................ 370/252 |

OTHER PUBLICATIONS

Extended Search Report in counterpart European Application No. 09010528, dated Oct. 15, 2009.
M. Arlitt et al., "An Analysis of TCP Reset Behaviour on the Internet," ACM SIGCOMM Computer Communication Review, Oct. 30, 2004.
Nicholas Weaver et al., "Detecting Forged TCP Reset Packets," Nov. 11, 2008, Retrieved from the Internet: URL: http://www.truststc.org/pubs/486.html.

* cited by examiner

*Primary Examiner* — Michael Thier
*Assistant Examiner* — Vincelas Louis
(74) *Attorney, Agent, or Firm* — Edell, Shapiro & Finnan, LLC (57) ABSTRACT

An apparatus for determining and displaying a transaction reset metric of individual transactions between host devices operating over a network includes a network management device, a processor, and a display device. The network management device monitors flows between the hosts, where the individual flows include individual transactions involving exchanges of packets. The network management device identifies flow resets that terminate flows between hosts. The processor evaluates the flow resets by identifying each flow reset that occurred during an incomplete transaction as a transaction reset and computes a transaction reset count metric as the sum of transaction resets that occur. The processor also identifies individual transactions terminated by a transaction reset. The display device displays on an individual transaction basis whether or not individual transactions were terminated by a transaction reset and displays the transaction reset count metric for selected portions of the network under test.

20 Claims, 4 Drawing Sheets

METHODS AND APPARATUS FOR DETERMINING AND DISPLAYING A TRANSACTION RESET METRIC

BACKGROUND

Service providers and enterprises have historically managed their networks by collecting information about data traffic at various points in the network and generating measures of network performance which can be evaluated and used for planning, establishing compliance, troubleshooting, and taking corrective action. Data relating to performance may be aggregated and presented according to certain time frames, applications, sites, devices (e.g., by server or client), and/or sessions between specific devices to provide the network administrator with insight into the nature and source of problems.

One performance metric that can be monitored is the number of occurrences of reset messages that terminate communication flows or sessions established between two devices. An unusually high number of reset messages occurring in a given time frame involving a particular device, connection, application, site, or across an enterprise may indicate an operational problem. Unfortunately, current monitoring techniques do not distinguish between "normal" reset messages that merely terminate inactive flows and reset messages that terminate flows during an ongoing transaction within the flow, resulting in an incomplete transaction. It would be desirable to enhance network monitoring capabilities by providing visibility into the impact of flow resets on individual transactions which may be ongoing.

SUMMARY

Methods and apparatus for determining and displaying a transaction reset metric of individual transactions between host devices of an enterprise operating over a network are described herein. A network management device monitors flows between the hosts, where the individual flows include individual transactions involving exchanges of packets. The network management device identifies flow resets that terminate flows between hosts. A processor evaluates the flow resets by identifying each flow reset that occurred during an incomplete transaction as a transaction reset and computes a transaction reset count metric as the sum of transaction resets that occur. The processor also identifies individual transactions terminated by a transaction reset. A display device displays on an individual transaction basis whether or not individual transactions were terminated by a transaction reset and displays the transaction reset count metric for selected portions of the enterprise.

The invention provides an enhanced capability to evaluate and display flow resets as they relate to individual transactions. For each transaction observed, the network management system determines whether the transaction was completed successfully or was incomplete at the time a flow reset occurred. The system thus has the ability to calculate and display a flow reset measurement for an individual transaction as well as the ability to determine and display whether a transaction was completed at the time a reset occurred or whether the transaction was incomplete and the reset caused the termination of the transaction.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
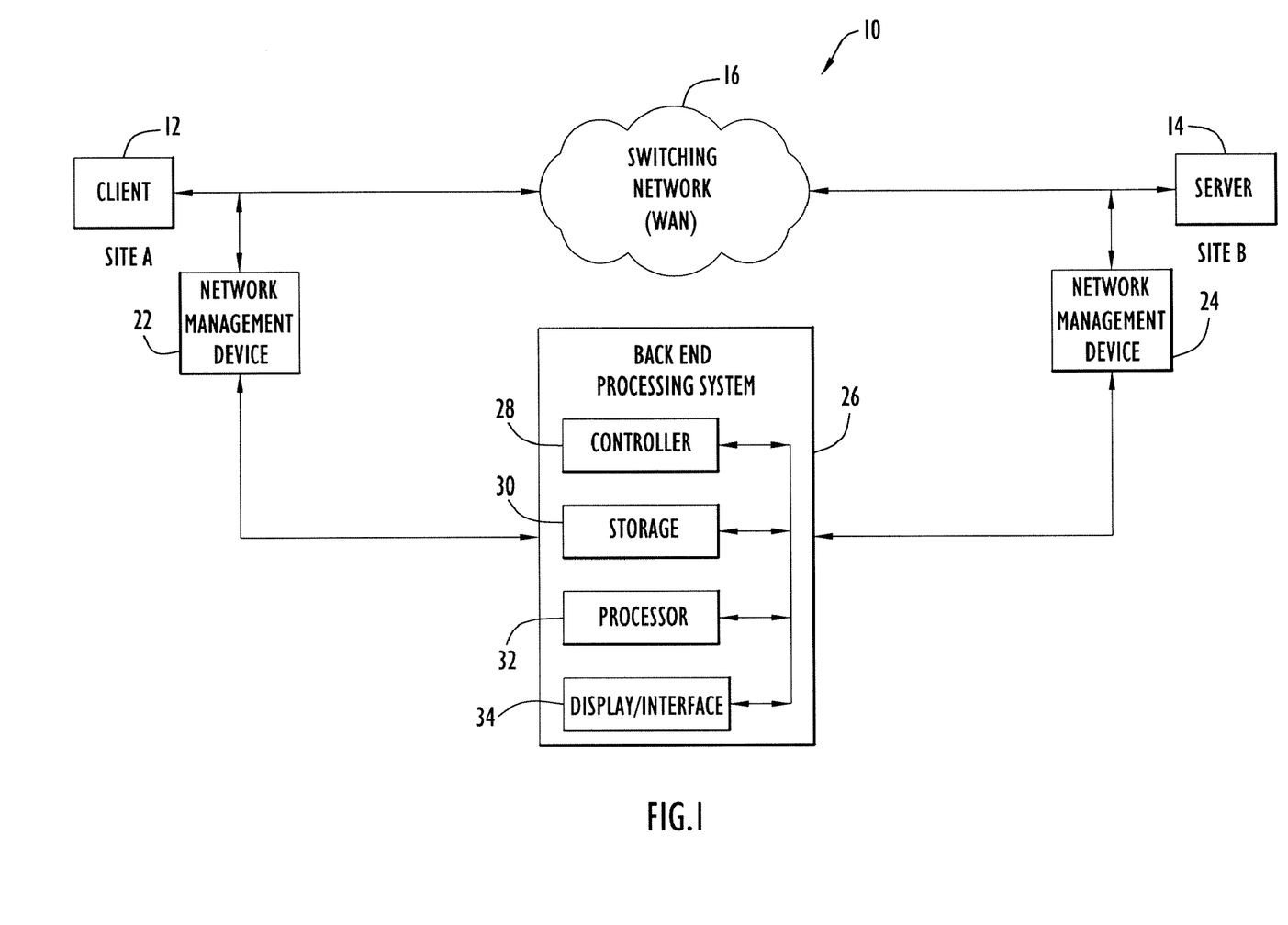
FIG. 1 is a block diagram of a network environment in which the network monitoring and analysis techniques described herein may be employed.

The following detailed explanations of FIGS. 1-4 and of the exemplary embodiments reveal the methods and apparatus of the present invention. FIG. 1 illustrates, at a very general level, a data transmission system (communication network) that includes a network management system for monitoring performance of the network. As shown in FIG. 1, an exemplary data transmission system 10 includes a number of sites, including sites A and B, and a switching network 16 such as a wide area network (WAN) to facilitate communications between the sites. Each of sites A and B can include, for example, one or more local area networks (LANs). Routers or switches (not shown in FIG. 1) can interconnect the local site LANs ultimately to the WAN represented by the switching network cloud 16 in FIG. 1. A packet traveling across the WAN between the devices at the endpoint sites traverses one or more network paths connecting the sites. Typically, a packet's path includes several physical communication links and intermediate devices (e.g., switches and/or routers) that transmit a packet along a correct route from one site to another, and transmit the response packets back across the network in the opposite direction.

Site A may include a client 12 that communicates with a server 14 at site B over network 16. The terms "client" and "server" are reference labels used here for convenience and descriptiveness due to their common usage in the art and to avoid confusion as to which end point is being referred to in the following descriptions of exchanges between devices at two locations. However, it will be appreciated that the invention is not limited to any particular devices or equipment, and the invention is applicable in the context of any computing devices or network equipment communicating or exchanging information over a network. Generically, both devices involved in an exchange over a network also can be considered "host" devices or simply "user" devices.

In the general example shown in FIG. 1, the data transmission system 10 can include any of a number of communications line types and a variety of data communications connections. Sites A and B are each capable of transmitting and receiving data packets in various protocols utilized by the communication lines. As used herein the terms "data network," "switching network," "network," "LAN," "WAN," etc. refer to networks that carry virtually any kind of information and are not limited to any particular type of hardware, technology, protocol, application, or data (audio, video, digital data, telephony, etc.). For illustrative purposes, only two sites (A and B) are shown in FIG. 1. However, it will be understood that the data communication system can include numerous sites, wherein each site is generally connected to multiple other sites over corresponding transmission circuits within the switching network.

The network management system essentially includes a number of network management devices (NMDs) 22, 24 located throughout the network, which monitor network activity and collect network performance data, and at least one back-end processing system 26 that coordinates and controls the system, collects and processes measurement data received from the NMDs, monitors and analyzes network performance, displays network performance, and notifies network operators when performance problems are detected. Such a network management system can provide, for example: accurate and reliable measurement of performance metrics such as network latency, response time, jitter, data delivery ratio, and throughput; management of user performance requirements with configurable sensitivity; a context-sensitive data repository which enables the assessment and evaluation of network performance with respect to circuit, time, bandwidth, and performance requirements; and/or forecasting of potential or developing network performance problems.

As shown in FIG. 1, network management devices (NMDs) 22 and 26 are respectively disposed at sites A and B or at some point between WAN 16 and sites A and B, respectively. In general, NMDs can be placed at virtually any point in the network or at any point within an enterprise LAN (e.g., at local sites, at intermediate points between local sites and the WAN, and within the WAN itself). The placement of the NMDs depends at least in part on the portion of the system or network over which a network service provider or other party wishes to monitor performance of data traffic flow. For example, NMDs can be connected to a local router or switch such that the NMD is not in-line with the data flow path through the router between the LAN(s) and the WAN. NMDs can also be connected in-line between a local router and a customer edge router (CER), or in-line between a CER and the WAN, for example.

The NMDs can be any type of monitoring device or probe and can comprise standalone hardware/software devices or software and/or hardware added to network equipment such as PCs, routers, CSU/DSUs (channel service unit/data service unit), FRADS, voice switches, phones, etc. Software embedded in the NMDs can collect network performance data for detailed analysis and report generation relating to any of a variety of performance metrics. By way of a non-limiting example, an NMD can be a CSU/DSU that operates both as standard CSU/DSU and as a managed device capable of monitoring and inserting network management traffic; an inline device residing between a DSU and router, which monitors network traffic and inserts network management traffic; or a passive monitoring device that only monitors network traffic. The NMDs can also be "active" monitoring devices capable of inserting test packets or messages into the data traffic.

In the example shown in FIG. 1, NMDs are respectively located at both the client site A and at the server site B; however, it is also possible to have an NMD at only one of the two sites involved in a client-server exchange. In the arrangement shown in FIG. 1, NMD 22 at client site A is not in-line with the traffic flow between client 12 and WAN 16; however, NMD 22 could be arranged in-line with client 12. The same configuration options exist for NMD 24 at the server site B.

Each NMD can collect measurement data useful for computing any of a variety of performance metrics associated with operation of the network including, but not limited to latency, response times, network round-trip time, jitter, data delivery ratio, throughput, and other measures indicative of delivery efficiency and failure rates. For example, in the TCP environment, a number of TCP-related performance metrics can be measured such as flow resets, transaction resets, zero window states (timings), the number of packet or message retransmissions that occur, the number of occurrences of packets being out of order, and data rates in terms of bytes and packets.

The backend processing system 26 of the network management system shown in FIG. 1 receives measurement data either directly or indirectly from the NMDs, and collects and stores measurement data and processes the data to produce the various displays and reports required to monitor performance of the network and its components. The architecture depicted in FIG. 1 is a conceptual diagram illustrating major functional units and does not necessarily illustrate physical relationships or specific physical devices within the backend processing system or between the backend processing system and the NMDs. The configuration and components of the backend processing system can take many forms and are described herein only in general terms for context. Those skilled in the art will appreciate that the techniques described herein for communicating within a network management system are applicable regardless of the particular architecture of the backend processing system or NMDs.

Backend processing system 26 includes a controller module 28 responsible for coordinating and controlling the network management system. For example, controller 28 may be responsible for sending instructions to the various NMDs and periodically polling the NMDs to collect measured data. A data storage capability of the backend processing system is represented by storage module 30 for storing measurement data as well as information generated by processing measurement data, such as aggregated report data, analysis results, and historical information. Processing system 26 further includes a management and processing capability represented in FIG. 1 by processor module 32, which performs various processing tasks, such as performing operations on raw measurement data to produce reports and performing analysis operations. The backend processing system 26 further includes a display, interface, and report capability represented by display/interface module 34, which displays performance information in a tabular or graphical manner via an interactive graphical user interface, for example, and preferably includes the capability to generate various performance reports. Display device 34 can be any of a wide variety of known devices, such as an LCD display whose optical state is transformed by controlling the color of light emitted by individual pixels based on input from a user (mouse, keypad, touch screen, etc.) or from a processor. For example, the display device 34 can be a graphical user interface (GUI) which allows the user to selectively control the format and content of the display.

The backend processing system 26 may receive measurement data directly from the NMDs or may receive measurement data indirectly (e.g., the NMDs may supply measurement data to a storage device at the local site, which is subsequently supplied to the backend processing system. Further, the backend processing system may be located at a single site or may have components distributed throughout the network at multiple locations. For example, storage module 30 may constitute storage capabilities at a number of local sites as well as a storage capability at one or more backend processing sites. Likewise, various backend processing tasks, nominally represented by processor 32 in FIG. 1, may be performed by a number of different processors that carry out specific tasks and that may be distributed throughout the network. Similarly, the display/interface capability may allow access to performance information via interfaces at a number of sites or via a web-based interface accessible to authorized customers or service provider personnel.

In general, communication over network 16 involves a bidirectional exchange of data (e.g., packets) between client 12 and server 14. Client 12 may initiate communication by opening a transport channel to server 14. Typically, the client sends a request in accordance with network and transport protocols, and the server responds to the request by sending some form of information or data back to the client. Certain protocols are connection-based, requiring the client and server to establish a communication session before exchanging information. This is generally accomplished by exchanging handshaking messages to establish a "connection" between the client and server. Once the connection is established, communication between the client and server can proceed by exchanging messages via packets or the like according to an underlying network protocol. Once the client and the server agree that the session is over or a timeout occurs, the connection underlying the session is terminated.

Networking protocols are used to carry out communications between the client and server. Several networking protocols have been designed and deployed, with varying characteristics and capabilities. At the network layer, the Internet Protocol (IP) is ubiquitous and is responsible for routing packets from one end host (client or server) to another. At the transport layer, the Transmission Control Protocol (TCP) and the User Datagram Protocol (UDP) are two examples of protocols that are in common use today. TCP provides a reliable, connection-oriented service on top of the unreliable packet delivery service provided by IP. Various other networking protocols might also be used.

A flow is an exchange of packets between a source address (e.g., a client) and a destination address (e.g., a server). Packets between the hosts are organized into flows by examining the source and destination addresses together with the source and destination port numbers (according to protocol) of the packet. In the case of TCP, a flow or session is an individual TCP socket connection. A TCP socket is initiated with a three-way handshaking scheme. The TCP flow continues until a final message exchange occurs or one of the hosts sends a reset message, e.g., as a result of a timeout. Thus, depending on how long the TCP socket connection is maintained, a TCP session or flow can be brief or last a considerable period of time.

Figure 2:
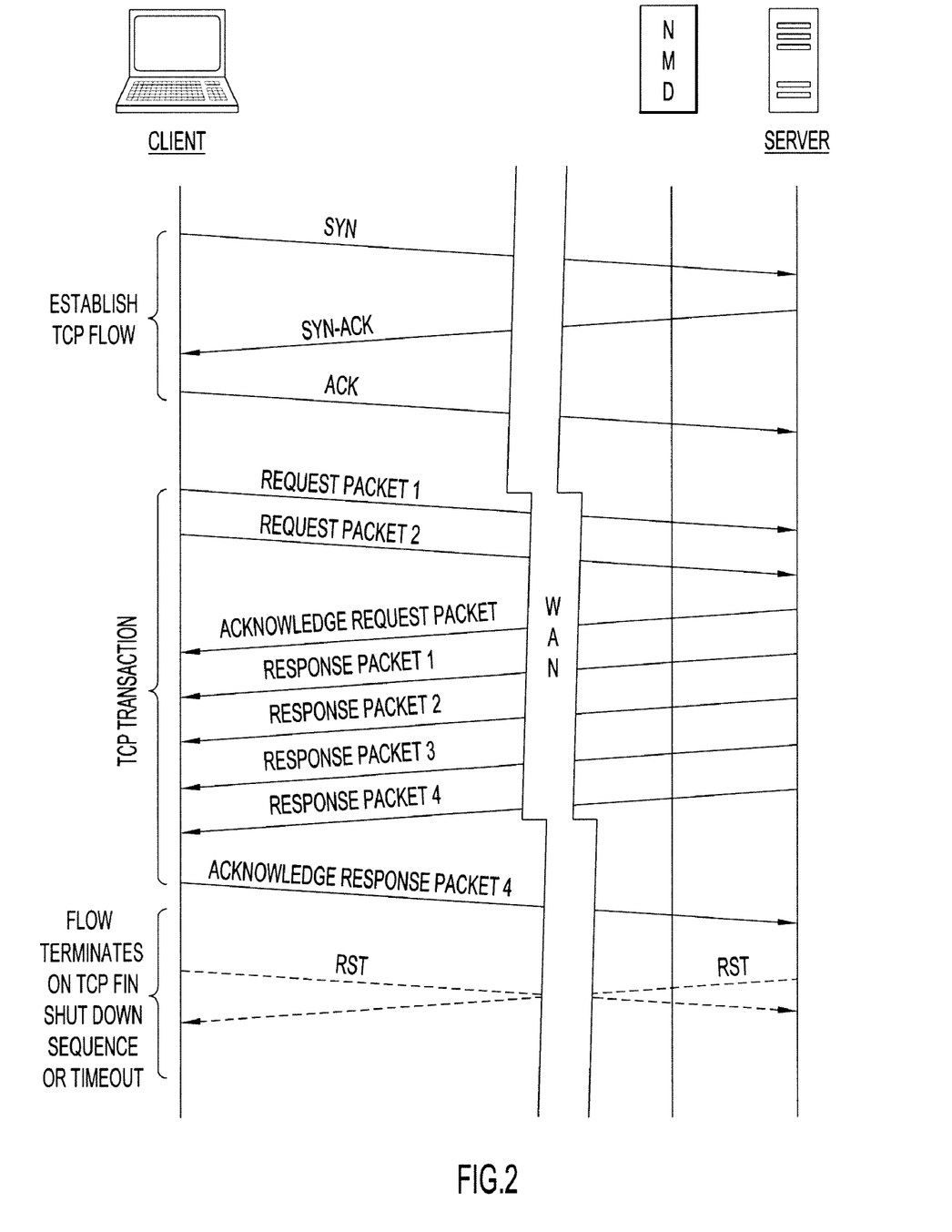
FIG. 2 is a representation of a TCP flow between a client and a server on a network, including a packet exchange that constitutes a TCP transaction within the flow.

As used herein, a "transaction" is an individual client request followed by the server's response to that request. In an individual flow, there can be any number N of transactions, from one to hundreds or more. FIG. 2 diagrammatically illustrates the timing and sequence of an individual TCP transaction within a TCP flow between a client and server. In the diagram of FIG. 2, time increases downward in the vertical direction, and the slope of the lines shown traveling between the client and server over the WAN suggests the passage of time across the network. Note that the timings and relative positioning of equipment shown in FIG. 2 are not necessarily to scale. For example, since the network management device is co-located with the server at the same site in this instance, the timing differences between the NMD and server may be very small or negligible relative to the time required for packets to traverse the WAN.

A TCP flow is initiated with a three-way handshaking scheme in which the client sends a SYN message to the server, the server responds with a SYN ACK message, and the client confirms with an ACK message. The TCP flow continues until a FIN message exchange occurs or one of the hosts sends a reset message, e.g., as a result of a timeout. In the case of a FIN message exchange, the connection termination phase involves at most a four-way handshake, with each side of the connection terminating independently. When one of the host devices wishes to stop its half of the connection, it transmits a FIN packet, which the other host device acknowledges with an ACK packet. Where the other host also initiates this sequence, the connection tear-down comprises a pair of FIN and ACK segments from each TCP endpoint. It is also possible to terminate the connection with a three-way handshake, where the first host sends a FIN packet, the second host replies with a FIN & ACK packet (combining two steps into one), and the first host replies with an ACK packet. A connection can be at least temporarily "half-open," where one host has initiated termination of its end of the connection, but the other host has not. The host that has initiated termination can no longer send any data on the connection; however, it can still receive and acknowledge data on the connection. In principle, the other host can still send, receive, and acknowledge data until it has initiated the termination sequence on its end of the socket.

A TCP flow can also be terminated by a reset message (RST) being sent by one of the host devices, as shown in FIG. 2. In principle, the reset message terminating the TCP flow can be sent either by the client or the server, as suggested by the two possible reset messages shown at the bottom of FIG. 2 (the dashed lines indicating the option of either host sending the reset message) originating from respective ends of the connection (only one such reset message is necessary to terminate the connection). Of course, it is possible for two reset messages to "cross" over the network, where both host devices send reset messages before receipt of the message on the other end. In principle, once a host has sent a reset message, it should no longer be able to send, receive, or acknowledge data on the connection.

For clarity only a single TCP transaction is shown within the TCP flow of FIG. 2; however, it will be appreciated that many such TCP transactions may occur within a TCP flow. The TCP transaction in this example begins with the client sending one or more request packets to the server over the WAN. In this example, a network management device is located at the server site and monitors packets that are being transmitted and received by the server. The server responds to the client request with an acknowledgement, and then sends a response by transmitting one or more response packets to the client over the WAN. Finally, the client acknowledges that it has received the response by sending an acknowledgement back to the server, which concludes a single transaction. The acknowledgement scheme can be configured in a number of ways. One common approach is for the client to acknowledge every other response packet by sending an acknowledgement packet back to the server. In the example shown in FIG. 2, only the final acknowledgement packet is shown for convenience.

Protocols other than TCP can be used to convey packets over a network (e.g., the UDP protocol). Such protocols may be connection based or connectionless and may also involve exchanges comparable to the flows and/or transactions described above. For example, certain non-TCP transactions which would occur in a non-TCP flow may differ from a TCP transaction in that the non-TCP transaction does not include an acknowledgement message being sent by the server to acknowledge the client's initial request or an acknowledgement message being sent by the client to acknowledge the server's response message. In this case, the server responds to the request directly by sending the requested data, and the transaction concludes upon the last of the response packets being received by the client. Another transaction can then be initiated by the client by sending another request message. Nevertheless, as in the case of TCP, the boundaries of a non-TCP transaction are determinable by the network monitoring system, and it is feasible to determine whether a reset message interrupted or terminated the transaction in process prior to being completed.

The network management system described herein can be embodied in a visual performance management product, including an application performance appliance (APA) that provides the ability to look at performance information on a flow-by-flow basis or on a TCP socket connection-by-TCP socket connection basis. Flow resets are one of a number of performance metrics of interest at this level. The occurrence of individual flow resets can be tracked on a per-flow basis, and statistics such as how many resets occurred in a time window across a group of clients or for an individual client or for an entire site or enterprise can be generated. From a visualization perspective, this provides the ability to identify trends in the resets over time and to see how many resets have occurred per any given application, set of users, etc. For example, an indication that an application has begun to experience an abnormally high number of flow resets relative to a baseline level of flow resets can be viewed graphically and may provide insight into the cause of performance issues or the cause of dropped connections. Identifying the source of the extraneous flow resets can guide troubleshooting decisions being made on how to approach solving a problem and point to whose responsibility it is to address the problem or what resource may be necessary.

Since TCP resets (or comparable non-TCP flow reset messages) signify the end of a flow, these flow resets have an effect on flows and socket connections and on connectivity itself. Consequently, tracking resets from a flow perspective or from a monitored application perspective is relatively straightforward. However, merely monitoring flow resets from a flow level or higher does not provide any insight into whether a flow reset cleanly terminated an inactive flow without disrupting an ongoing transaction or whether a transaction still in progress within the flow was prematurely or unexpectedly terminated by the flow reset, potentially resulting in a loss of data.

The invention provides an enhanced capability to evaluate and display flow resets as they relate to individual transactions. For each transaction observed, the network management system determines whether the transaction was completed successfully or was incomplete at the time a flow reset occurred. The system thus has the ability to calculate and display a flow reset measurement for an individual transaction as well as the ability to determine and display whether a transaction was completed at the time a reset occurred or whether the transaction was incomplete and the reset caused the termination of the transaction.

This enhanced capability to track flow resets, such as TCP resets, at a transaction level and in the context of individual transactions potentially provides useful insight into network problems that may not be available at higher levels. Ideally, observed TCP resets are simply terminating flows which have run their course, and so in many cases TCP resets are normal, expected, and useful. With visibility down to only the flow level, without more information, an increase in TCP resets does not necessarily indicate a significant problem. Conversely, the overall number of TCP resets being observed at a flow level or higher may remain relatively normal at a time when an unacceptably high number of transactions are being improperly terminated by TCP resets, resulting in a problem going undetected. Thus, merely tracking the number of TCP or flow resets without knowing whether the resets caused ongoing transactions to be terminated gives limited insight into whether the resets signify an operational problem or the nature of a problem.

At a transaction level, if a transaction is in process within a flow and a flow reset occurs for that flow, the flow reset represents a significant, negative event, because the desired transaction was never completed and whatever the user was trying to accomplish did not occur or was not completed. Either the client device did not receive all the data requested or the server was not able to send all the data requested. The ability to measure and display the impact of flow resets from a transaction-by-transaction perspective provides visibility into whether such events are occurring and insight into the nature of network problems and possible solutions.

The invention provides analysis and information about individual transactions within a flow, and in particular whether or not each transaction was terminated by a flow reset. The invention also determines for each flow reset whether the flow reset occurred during an incomplete transaction or after a transaction was completed (i.e., a graceful reset ending a completed flow) and tracks the number of flow resets that are "normal" and the number of flow resets that are "transaction resets" (i.e., that terminate a transaction).

Figure 3:
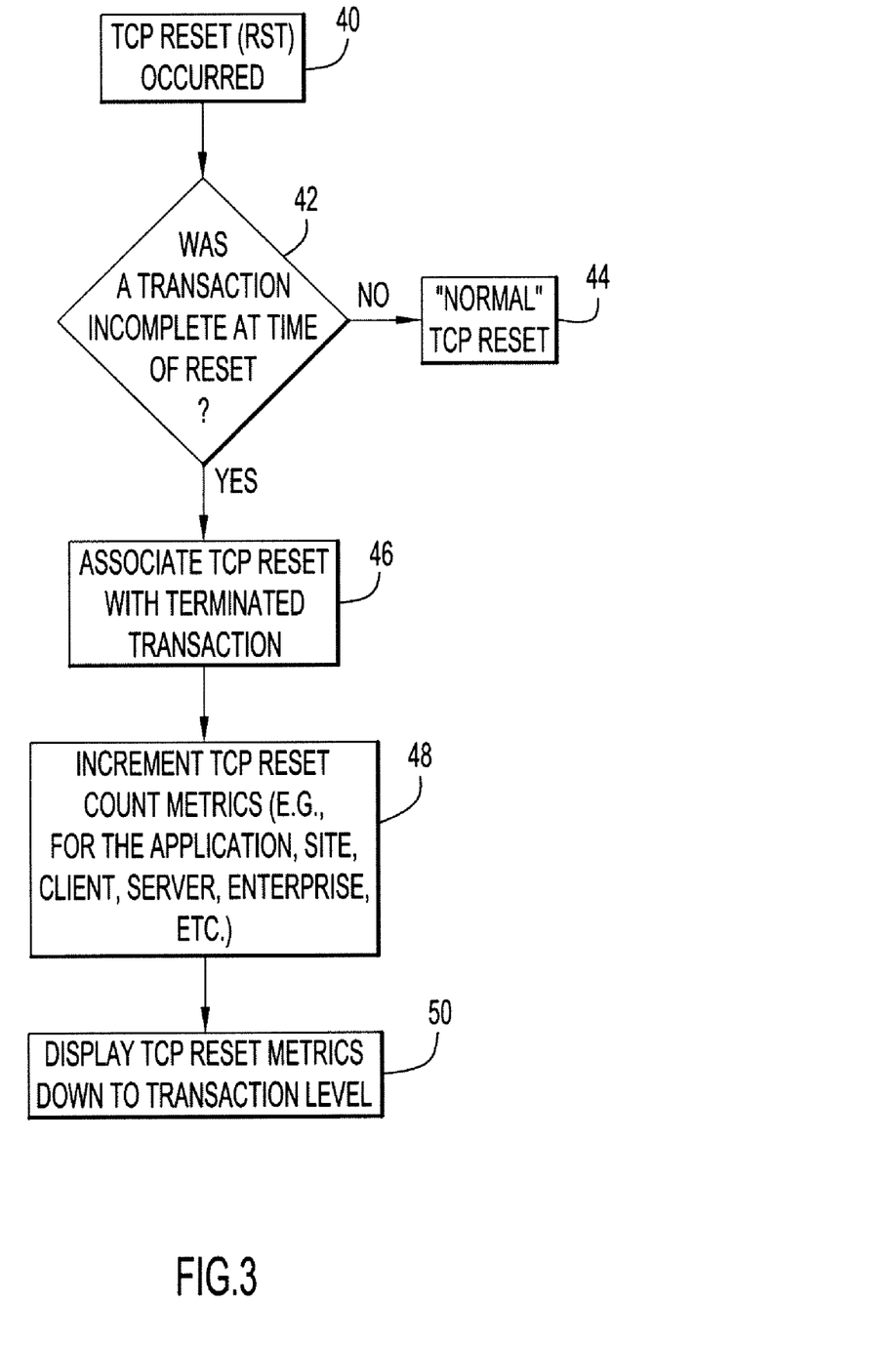
FIG. 3 is a top-level functional flow diagram of operations performed by a network management system to compute a transaction reset metric according to an embodiment of the invention.

FIG. 3 is a top-level flow diagram of the methodology employed to carry out an embodiment of the invention. The example process shown in FIG. 3 relates to TCP flows, transactions, and resets (see FIG. 2); however, it will be appreciated that the invention is not limited specifically to the TCP protocol and is equally applicable to other protocols with definable transactions. In operation 40, a TCP reset (RST) packet is detected by a network management device (NMD) such as one of those shown in FIG. 1. Specifically, the TCP reset packet traverses a point in the line being monitored by an NMD and is reported to the processing system.

In operation 42, a determination is made as to whether a transaction was open or incomplete at the time the reset occurred. Specifically, the TCP flow that was terminated by the TCP reset packet is identifiable from the source and destination addresses in the TCP reset packet itself. The timing of the TCP reset packet can then be compared to the timings of other packets in the flow or the timings of stages of individual transactions in the flow, as detailed in FIG. 4 below, to determine whether any one of the transactions within the terminated TCP flow were incomplete at the time of the TCP reset. The timings can be established, for example, by timestamps applied by the NMD.

If no transactions within the flow terminated by the TCP reset packet were incomplete at the time of the TCP reset packet, in operation 44, the TCP reset packet is considered to be "normal," meaning all transactions within the flow were completed and the TCP reset packet merely terminated the flow in a benign, expected manner. Optionally, the network management system can track the number of "normal" TCP resets and/or the number of all TCP resets (both normal and those that terminate transactions). In either of these cases, the occurrence of a "normal" TCP reset is used to increment any counter used to track the TCP resets. For example, the number of normal or total TCP resets can be tracked over time on a host device basis (client or server), on an application basis, on a site basis, or over an entire enterprise. Further, in the event a "normal" TCP reset occurs, all of the transactions within the associated TCP flow can be considered completed at least in the sense that they are determined not to have been terminated by a TCP reset. For example, a binary field or flag associated with each transaction can be set to a "0" state to indicate that the transaction was not terminated by a TCP reset.

On the other hand, if in operation 42, a transaction within the TCP flow was incomplete at the time the TCP reset terminating the TCP flow occurred, the TCP reset is determined to have also terminated the transaction and is therefore considered to be not only a flow reset but also a "transaction reset." In this case, the incomplete transaction is determined to have been terminated by the TCP reset and this information is stored in the transaction record and available to be displayed (operation 46). For example, the aforementioned field or flag can be set to a "1" state to indicate the transaction was terminated by a flow reset. The reset indicator field or flag of any other transactions that had been completed within the terminated TCP flow can be set to "0" to indicate that these transactions were completed without a TCP reset occurring.

Further, since the TCP reset was determined to terminate not just a flow but also a transaction within the flow, in operation 48, one or more transaction reset count metrics are incremented to indicate the occurrence of a transaction reset, i.e., a problematic or "bad" TCP reset that could indicate the existence of an operational problem. The transaction reset count metrics can be incremented for any of the entities associated with the flow terminated by the TCP reset. For example, transaction reset count metrics can be maintained for the application, hosts (server and/or client), and site(s) associated with the terminated flow and for the entire enterprise. Counts can be maintained for certain time periods (e.g., the number of transaction resets for an application for every fifteen minute period), which can then be aggregated over longer periods of time (e.g., the sum of the transaction reset counts occurring in a day equals the sum of the counts within the 96 fifteen minute periods for that day).

The processor has the further capability to aggregate the transaction reset count metric to higher levels. By selecting the appropriate options via the user interface, the display device can be configured to display on an individual transaction or flow basis the existence of a transaction reset. Likewise, the transaction reset count metric can be computed at the application level (e.g., on an application-by-application basis) based on transactions or flows that constitute the applications. The same principle applies at the host (e.g., server) or site level, where the transaction reset count metric is displayed on an individual host or site basis. In this manner, the transaction reset count metric can be successively "rolled up" from the transaction level to the enterprise level.

Once the transaction reset count metrics have been incremented and the affected transaction has been flagged, this information is available to be displayed via a user interface, as described below in greater detail (operation 50 in FIG. 3).

Figure 4:
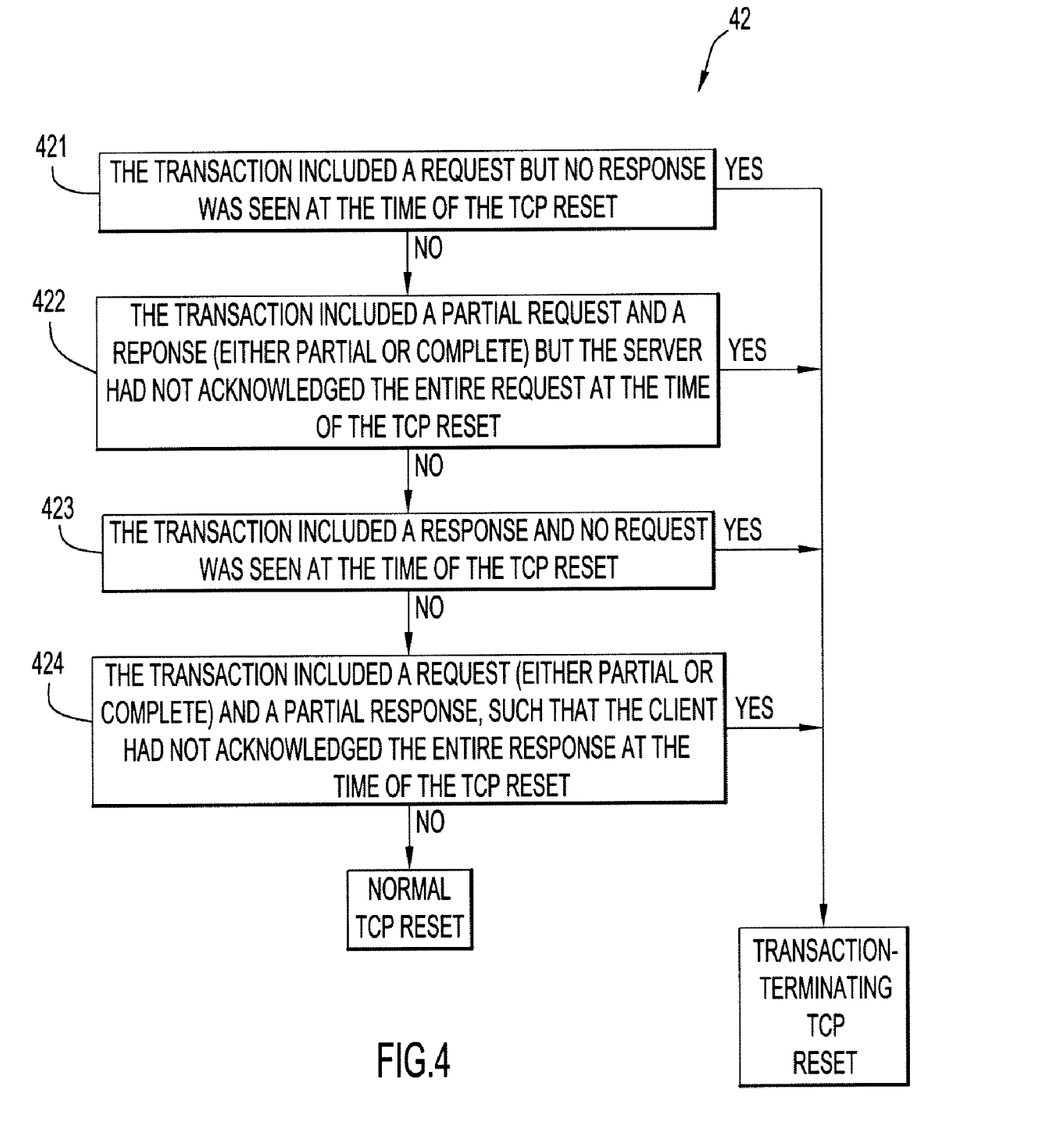
FIG. 4 is a flow diagram of decision logic used to determine whether a transaction was incomplete at the time of a flow reset.

An example of the decision logic that can be used in operation 42 to determine whether a transaction was incomplete at the time a TCP flow reset occurred is shown in the flow diagram of FIG. 4. In particular, the transaction reset count metric(s) are incremented in a number of scenarios which suggest that a transaction was not fully or properly completed at the time the reset occurred. Referring back to the TCP transaction shown in FIG. 2, this can be understood conceptually as attempting to determine whether any of the four stages of the TCP transaction were not fully completed at the time of the TCP flow reset, which would suggest that some or all of the information being requested or sent in the transaction was not received as intended.

The logic shown in FIG. 4 refers to a specific transaction being evaluated. Each transaction in a reset-terminated flow can be evaluated in this manner or, optionally, only the flow or flows whose timing suggests a possible termination by the reset packet may need to be evaluated (screening out earlier transactions within the flow). In operation 421, if the transaction included a request from the client and no response from the server was seen at the time of the TCP reset, the TCP reset is determined to be a transaction-terminating TCP reset ("transaction reset"). Otherwise, the decision logic proceeds to operation 422.

In operation 422, if the transaction included a partial request and a response (either partial or complete) such that the server had not acknowledged the entire request at the time of the TCP reset, the TCP reset is determined to be a transaction reset. Due to the nature of TCP transactions, this scenario would be unusual, since it would suggest that the server responded to the request without first acknowledging the request. However, this could come into play where the observed packet information is incomplete for some reason. This scenario could also occur when an application that is streaming in nature is being analyzed as though it is a transaction-oriented application.

If the condition in operation 422 is not met, the decision logic proceeds to operation 423. In operation 423, if the transaction included a response but no request was seen at the time of the TCP reset, the TCP reset is determined to be a transaction reset. Here again, this condition violates the underlying mechanism of a TCP transaction, which requires a request to trigger a response. However, like the scenario in operation 422, this scenario could occur if the observed information is incomplete or missing and the management system does not have the entire picture of what transpired within the transaction. Nevertheless, because it cannot be confirmed that the transaction was fully completed at the time the client or server sent a TCP reset, the reset is considered a transaction reset.

If the condition in operation 423 is not met, flow proceeds to operation 424. In operation 424, if the transaction included a request (either partial or complete) and a partial response, such that the client had not acknowledged the entire response at the time of the TCP reset, the TCP reset is determined to be a transaction reset. This is a more conventional scenario in which the request or only a portion of the request had been seen and only a portion of the response had been transmitted by the server and acknowledged by the client at the time of the TCP reset. As shown in FIG. 2, the request and/or response may include multiple packets. This case covers the scenario in which a request is observed but only a portion of the response has occurred at the time of the flow reset. It is also possible that, with a multi-packet request, there is evidence that the second packet of the request was received but not the first packet of the request. While the server may acknowledge both the first and second request packets, from the perspective of the monitoring system, the transaction is still incomplete in some respect. Likewise, if not all response packets or acknowledgement packets have been accounted for at the time of the TCP reset, the TCP reset is considered a transaction reset. If the conditions in operation 424 are not met, the TCP flow reset is determined not to have terminated a transaction with the flow and is therefore "normal." If more than one transaction is being evaluated, the flow reset is determined to be "normal" only if none of the conditions in operations 421-424 are met for all of the transactions being evaluated.

As an overview of the logic shown in FIG. 4, from the management system's observation standpoint, there may be full visibility into what is occurring in a transaction and therefore clarity as to whether the flow reset caused a problem with the transaction. However, another possibility is that the management system has an incomplete view which indicates that there was an attempt to perform a transaction, but it cannot be definitively confirmed that the transaction was completed successfully at the time a TCP reset occurred. However, there is sufficient visibility to conclude that something abnormal happened. In all of these scenarios, the flow reset will be deemed a transaction reset.

It will be appreciated that the above described operations and methodologies can be carried out by executing instructions stored on a computer readable medium (i.e., software) on a processor or processors located within the network management system (e.g., within an NMD and/or one or more separate computing devices or processors).

The network management system controls a display device to display to the user or operator some sense from the transaction reset count metric whether a problem exists. At the transaction level, individual transactions can be shown in a transaction log view, which is essentially a sequential listing of transactions. The transactions included in the log can be limited by any of a number of criteria based on user-selectable filters. For example, in an unfiltered case, every transaction in an enterprise can be listed. However, the list can be limited to certain applications, certain servers or clients, certain time windows, certain ports, certain sites, certain performance levels, and combinations thereof. For example, the list of transactions in the log can be limited to only the transactions of certain sites, applications, or servers whose performance is below a certain level for a certain performance metric. Generally, the user has the option to "drill down" to the transaction level from a higher level. For example, if the user sees that the performance of the enterprise is below normal, the user can use the visual performance manager to look at the performance of certain sites, servers, and/or applications, and can then go further down to the level of individual flows and ultimately down to the level of individual transactions within a flow in order to find root causes of performance problems.

Each transaction listed in the log includes certain information about the transaction, and the user may select which information fields are displayed for the transactions. For example, each transaction entry may include a transaction number, a date and time the transaction occurred, an application identifier, a client IP address, a server IP address, the type of request made in the transaction, and an indication of whether the transaction was successfully completed or terminated in an incomplete state by a reset message. In particular, for each individual transaction listed, a reset field can be displayed with a binary indicator (0 or 1, yes or no, etc.) that indicates whether a TCP reset occurred prior to completing the transaction.

The transaction log view can be customized by the user using filtering options presented within the visual performance manager. For example, within a filter section window, the user can be presented with a variety of filter fields, which may be fillable or selectable from drop-down lists. The filtering options may include fields such as: time range, application(s), site(s), server(s), client IP(s), certain request types, certain response types, transaction type(s), and certain performance metrics, including the transaction-by-transaction reset indicator. The resulting transaction log is then displayed based on the user-selected filtering. In addition to visualizing the transaction resets on a transaction-by-transaction basis, the transaction resets can also be visualized on a flow-by-flow basis.

As previously noted, the transaction resets associated with individual transaction can be aggregated or "rolled up" into a transaction reset count metric applicable to an application, client, server, site, or the entire enterprise, and the transaction reset count metric can view at any of these levels with suitable filter and time windowing via the display of the visual performance manager. Thus, for example, for any individual client IP address talking to a particular server on a particular application, the user is able to look at the transaction reset count metric and see how many transaction resets occurred and determine whether the count was different than normal or some baseline and by how much. The transaction reset count metric can then be taken up to the level of the application across the entire enterprise or for a particular site across all the applications, and again evaluated relative to an expected or baseline level, providing visibility from top to bottom within the enterprise.

Having described embodiments of methods and apparatus for determining and displaying a transaction reset metric, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for determining and displaying a transaction reset metric of individual transactions between host devices of an enterprise operating over a network, comprising:
    a network management device configured to monitor data traffic at a point between host devices communicating over the network, the data traffic comprising individual flows between the host devices, wherein the individual flows include individual transactions comprising an exchange of packets, the network management device identifying flow resets that terminate flows between host devices;
    a processor configured to evaluate the flow resets detected by the network management device by determining whether each flow reset occurred during an incomplete transaction within a flow, resulting in termination of an ongoing transaction within the flow, or merely terminated a flow without terminating an ongoing transaction within the flow, identifying each flow reset that occurred during an incomplete transaction within a flow as a transaction reset, and computing a transaction reset count metric as a sum of transaction resets that occur, wherein the processor is further configured to identify individual transactions terminated by a transaction reset; and
    a display device configured to display on an individual transaction basis whether or not individual transactions were terminated by a transaction reset and to display the transaction reset count metric for one or more selected portions of the enterprise.

2. The apparatus of claim 1, wherein at least some of the individual flows comprise transmission control protocol (TCP) flows, and the individual transactions comprise TCP transactions.

3. The apparatus of claim 1, wherein the processor is further configured to compute the transaction reset count metric at an application level, and wherein the display device is further configured to display on the transaction reset count metric at the application level.

4. The apparatus of claim 1, wherein the processor is further configured to compute the transaction reset count metric at a host device level, and wherein the display device is further configured to display the transaction reset count metric at the host device level.

5. The apparatus of claim 1, wherein the processor is further configured to compute the transaction reset count metric at a site level, and wherein the display device is further configured to display the transaction reset count metric at the site level.

6. The apparatus of claim 1, wherein the processor is further configured to compute the transaction reset count metric at an enterprise level, and wherein the display device is further configured to display the transaction reset count metric at the enterprise level.

7. The apparatus of claim 1, wherein the display device is further configured to display the individual transactions in a log listing, wherein each log entry includes a field identifying the transaction and a field indicating whether or not the transaction was terminated by a transaction reset.

8. The apparatus of claim 1, wherein the processor determines that a flow reset is a transaction reset if one of the following conditions occurred during a transaction between first and second host devices:
 the transaction included a request from the first host device but no response from the second host device had been detected at the time the flow reset occurred;
 the transaction included a partial request from the first host device and at least a partial response from the second host device but the second host had not acknowledged at least a portion of the request at the time the flow reset occurred;
 the transaction included a response from the second host device but no request from the first host device had been detected at the time the flow reset occurred; and
 the transaction included at least a partial request from the first host device and at least a partial response from the second host device, but the first host device had not acknowledged all of the response at the time the flow reset occurred.

9. A method for determining and displaying a transaction reset metric of individual transactions between host devices of an enterprise operating over a network, comprising:
 identifying flow resets that terminate flows between host devices, wherein individual flows include individual transactions comprising an exchange of packets;
 evaluating the flow resets by determining whether each flow reset occurred during an incomplete transaction within a flow, resulting in termination of an ongoing transaction within the flow, or merely terminated a flow without terminating an ongoing transaction within the flow, and identifying each flow reset that occurred during an incomplete transaction within a flow as a transaction reset;
 computing a transaction reset count metric as a sum of transaction resets that occur;
 identifying individual transactions terminated by a transaction reset; and
 controlling a display device to display on an individual transaction basis whether or not individual transactions were terminated by a transaction reset and to display the transaction reset count metric for one or more selected portions of the enterprise.

10. The method of claim 9, wherein at least some of the individual flows comprise transmission control protocol (TCP) flows, and the individual transactions comprise TCP transactions.

11. The method of claim 9, further comprising:
 computing the transaction reset count metric at an application level; and
 controlling the display device to display on the transaction reset count metric at the application level.

12. The method of claim 9, further comprising:
 computing the transaction reset count metric at a host device level, and
 controlling the display device to display the transaction reset count metric at the host device level.

13. The method of claim 9, further comprising:
 computing the transaction reset count metric at a site level; and
 controlling the display device to display the transaction reset count metric at the site level.

14. The method of claim 9, further comprising:
 computing the transaction reset count metric at an enterprise level; and
 controlling the display device to display the transaction reset count metric at the enterprise level.

15. The method of claim 9, further comprising:
 controlling the display device to display the individual transactions in a log listing, wherein each log entry includes a field identifying the transaction and a field indicating whether or not the transaction was terminated by a transaction reset.

16. The method of claim 9, wherein evaluating the flow resets including determining that a flow reset is a transaction reset if one of the following conditions occurred during a transaction between first and second host devices:
 the transaction included a request from the first host device but no response from the second host device had been detected at the time the flow reset occurred;
 the transaction included a partial request from the first host device and at least a partial response from the second host device but the second host had not acknowledged at least a portion of the request at the time the flow reset occurred;
 the transaction included a response from the second host device but no request from the first host device had been detected at the time the flow reset occurred; and
 the transaction included at least a partial request from the first host device and at least a partial response from the second host device, but the first host device had not acknowledged all of the response at the time the flow reset occurred.

17. A non-transitory computer readable medium storing instructions, that when executed by a computer, cause the computer to perform functions of:
 identifying flow resets that terminate flows between host devices, wherein individual flows include individual transactions comprising an exchange of packets;
 evaluating the flow resets by determining whether each flow reset occurred during an incomplete transaction within a flow, resulting in termination of an ongoing transaction within the flow, or merely terminated a flow without terminating an ongoing transaction within the flow, and identifying each flow reset that occurred during an incomplete transaction within a flow as a transaction reset;
 computing a transaction reset count metric as a sum of transaction resets that occur;
 identifying individual transactions terminated by a transaction reset; and
 controlling a display device to display on an individual transaction basis whether or not individual transactions were terminated by a transaction reset and to display the transaction reset count metric for one or more selected portions of the enterprise.

18. The computer readable medium of claim 17, storing further instructions, that when executed by a computer, cause the computer to perform the further functions of:

computing the transaction reset count metric at an application level; and controlling the display device to display on the transaction reset count metric at the application level.

19. The computer readable medium of claim 17, storing further instructions, that when executed by a computer, cause the computer to perform the further functions of:

computing the transaction reset count metric at a host device level, and controlling the display device to display the transaction reset count metric at the host device level.

20. The computer readable medium of claim 17, storing further instructions, that when executed by a computer, cause the computer to perform the further functions of:

computing the transaction reset count metric at a site level; and controlling the display device to display the transaction reset count metric at the site level.

* * * * *